US009767339B1

(12) United States Patent
He et al.

(10) Patent No.: US 9,767,339 B1
(45) Date of Patent: Sep. 19, 2017

(54) FINGERPRINT IDENTIFICATION DEVICE

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 41 days.

(21) Appl. No.: 15/075,005

(22) Filed: Mar. 18, 2016

(51) Int. Cl.
*G06K 9/00* (2006.01)

(52) U.S. Cl.
CPC ....... *G06K 9/0002* (2013.01); *G06K 9/00087* (2013.01)

(58) Field of Classification Search
None
See application file for complete search history.

(56) References Cited

U.S. PATENT DOCUMENTS

| | | | | |
|---|---|---|---|---|
| 6,647,133 B1* | 11/2003 | Morita | ............... | G06K 9/00013 340/562 |
| 7,878,075 B2* | 2/2011 | Johansson | ............... | B25J 13/084 73/862.046 |
| 8,564,314 B2* | 10/2013 | Shaikh | ............... | G06K 9/0002 324/658 |
| 9,514,350 B2* | 12/2016 | Wang | ............... | G06K 9/00087 |
| 9,595,185 B1* | 3/2017 | Hall | ............... | E03D 5/10 |
| 2004/0252867 A1* | 12/2004 | Lan | ............... | G06K 9/0004 382/124 |
| 2012/0057743 A1* | 3/2012 | Priore | ............... | G01J 3/02 382/100 |
| 2013/0002607 A1* | 1/2013 | Bayramoglu | ............... | G06F 3/044 345/174 |
| 2013/0135247 A1* | 5/2013 | Na | ............... | G06F 21/32 345/174 |
| 2015/0161461 A1* | 6/2015 | McNulty | ............... | G06K 9/00073 382/116 |
| 2017/0006223 A1* | 1/2017 | Hargreaves | ............... | G06K 9/38 |

OTHER PUBLICATIONS

Kiyavash, Negar, and Pierre Moulin. "Regular simplex fingerprints and their optimality properties." Digital Watermarking (2005): 97-109.*

* cited by examiner

*Primary Examiner* — Andrae S Allison
(74) *Attorney, Agent, or Firm* — J.C. Patents

(57) ABSTRACT

A fingerprint identification device includes a sensing array, a reading line, a first signal source, and first to third signal lines. The reading line is disposed in a first metal layer and is electrically connected to a sensing electrode. The first signal source generates a reference signal and is connected to the reading line through an impedance element. The sensing electrode and the impedance element generate a sensing signal in response to the reference signal. The first and second signal lines are disposed in the first metal layer. The third signal line is disposed in a second metal layer. The reading line is disposed between the first and second signal lines. An orthogonal projection of the reading line on the second metal layer overlaps an orthogonal projection of the third signal line on the second metal layer. The first to third signal lines receive the reference signal.

13 Claims, 3 Drawing Sheets

FINGERPRINT IDENTIFICATION DEVICE

BACKGROUND OF THE INVENTION

Field of the Invention

The invention relates to a fingerprint identification technology and particularly relates to a capacitive fingerprint identification device.

Description of Related Art

A capacitive fingerprint identification device has the advantages of small size and low cost and therefore has been widely used in various electronic devices. The capacitive fingerprint identification device includes a sensing array composed of a plurality of sensing electrodes and uses the capacitor difference, which the sensing electrodes form with respect to ridges and valleys on the finger surface, to obtain a fingerprint image. However, the capacitor difference, which the sensing electrodes form with respect to the ridges and the valleys, is small. For example, capacitors formed by the sensing electrodes with respect to the ridges and the valleys may be merely 0.1 fF (femtofarad) and 1 fF. For this reason, the fingerprint identification device is easily affected by the parasitic capacitors in the environment and cannot accurately identify the fingerprint. As a result, the accuracy of the fingerprint identification device is low.

SUMMARY OF THE INVENTION

The invention provides a fingerprint identification device that transmits a reference signal to a reading line through an impedance element, wherein signal lines adjacent to the reading line also receives the reference signal. Accordingly, influence caused by parasitic capacitors to the fingerprint identification device is reduced, so as to improve the accuracy of the fingerprint identification device.

A fingerprint identification device of the invention includes a sensing array, a reading line, a first signal source, and first to third signal lines. The sensing array includes a sensing electrode to detect a fingerprint. The reading line is disposed in a first metal layer and is electrically connected to the sensing electrode. The first signal source generates a reference signal and is electrically connected to the reading line through an impedance element. The sensing electrode and the impedance element generate a sensing signal in response to the reference signal, and the fingerprint identification device identifies the fingerprint according to the sensing signal. The first signal line and the second signal line are disposed in the first metal layer. The third signal line is disposed in a second metal layer. The reading line is disposed between the first signal line and the second signal line. An orthogonal projection of the reading line on the second metal layer overlaps an orthogonal projection of the third signal line on the second metal layer. The first to the third signal lines receive the reference signal.

In an embodiment of the invention, the fingerprint identification device further includes a switch. The switch is electrically connected between the reading line and the sensing electrode.

In an embodiment of the invention, the fingerprint identification device further includes a processing circuit. The processing circuit is electrically connected to the reading line. When the switch is turned on, the processing circuit receives the sensing signal through the reading line and converts the sensing signal into sensing information.

Based on the above, the fingerprint identification device of the invention uses the impedance element to transmit the reference signal to the reading line, and the signal lines adjacent to the reading line also receive the reference signal. Thereby, the signal levels on the reading line and the signal lines change synchronously. Accordingly, influence caused by the parasitic capacitors to the fingerprint identification device is reduced, so as to improve the accuracy of the fingerprint identification device.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
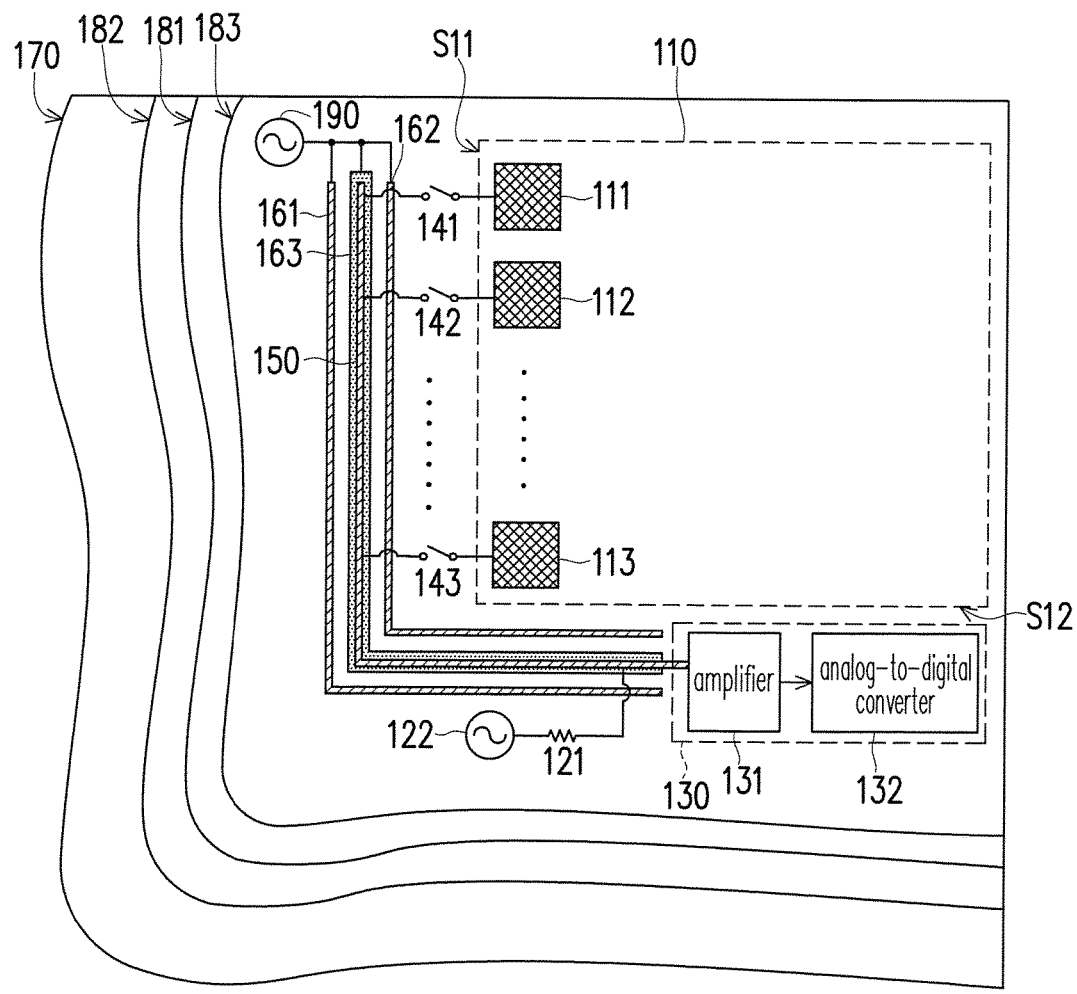
FIG. 1 is a schematic diagram of a fingerprint identification device according to an embodiment of the invention.

FIG. 1 is a schematic diagram of a fingerprint identification device according to an embodiment of the invention. As shown in FIG. 1, a fingerprint identification device 100 includes a sensing array 110, an impedance element 121, a signal source 122, a processing circuit 130, a plurality of switches 141-143, a reading line 150, and a plurality of signal lines 161-163. The impedance element 121 is a resistor, for example. The signal source 122 is a signal generation circuit, for example. In addition, the sensing array 110 includes a plurality of sensing electrodes 111-113 to detect a fingerprint of a user.

More specifically, the fingerprint identification device 100 further includes a substrate 170 and a plurality of metal layers 181-183. The metal layer 183, the metal layer 181, and the metal layer 182 are stacked sequentially on the substrate 170. In other words, the metal layer 182 is disposed between the metal layer 181 and the substrate 170, and the metal layer 181 is disposed between the metal layer 183 and the metal layer 182. Moreover, the sensing electrodes 111-113 are disposed in the metal layer 183. The reading line 150, the signal line 161, and the signal line 162 are disposed in the metal layer 181. The signal line 163 is disposed in the metal layer 182.

It should be noted that the reading line 150 and the signal lines 161 and 162 are located in the same metal layer 181, and the reading line 150 is disposed between the signal line 161 and the signal line 162. Moreover, the reading line 150 and the signal line 163 are located in different metal layers, and an orthogonal projection of the reading line 150 on the metal layer 182 overlaps an orthogonal projection of the signal line 163 on the metal layer 182. Namely, the orthogonal projections of the reading line 150 and the signal line 163 on a plane where the signal line 163 is located are overlapped with each other. In other words, the signal line 161 and the signal line 162 are disposed on two sides of the reading line 150. The signal line 163 is disposed right under the reading line 150. Accordingly, the signal lines 161-163 surround the reading line 150 respectively on the left and right sides and the bottom side.

The switches 141-143 are one-to-one corresponding to the sensing electrodes 111-113. Each switch is electrically connected between the reading line 150 and the corresponding sensing electrode. For example, the switch 141 is electrically connected between the reading line 150 and the sensing electrode 111. In addition, the signal source 122 is electrically connected to the reading line 150 through the impedance element 121. Further, the processing circuit 130 includes an amplifier 131 and an analog-to-digital converter 132. The amplifier 131 is electrically connected between the reading line 150 and the analog-to-digital converter 132.

In terms of operation, a finger of the user may press on a protective layer (not shown) located above the sensing array 110, such that the sensing electrodes 111-113 form a plurality of capacitors with the finger surface. In addition, the formed capacitors have different capacitances according to ridges and valleys on the finger surface. For example, distances between the ridges and the sensing electrodes are different from distances between the valleys and the sensing electrodes. Accordingly, the capacitors formed between the ridges and the sensing electrodes are greater than the capacitors formed between the valleys and the sensing electrodes.

Moreover, a capacitor between the finger and the sensing electrode form a RC (resistor-capacitor) circuit with the impedance element 121. The RC circuit generates a sensing signal in response to a reference signal generated by the signal source 122. Because the capacitor of the RC circuit has different capacitance according to different characteristics (e.g., ridge and valley) of the fingerprint, the RC circuit generates sensing signal with different levels in response to the different characteristics of the fingerprint. Thus, the fingerprint identification device 100 identifies the user's fingerprint according to the sensing signal, so as to obtain a fingerprint image.

Figure 2:
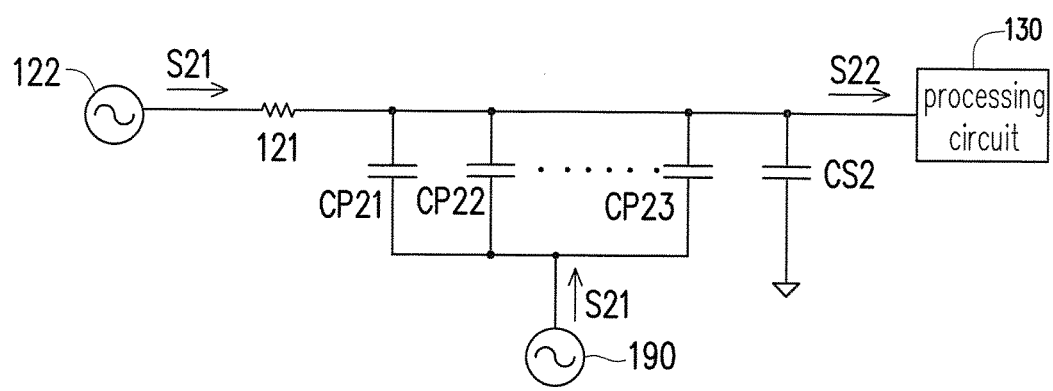
FIG. 2 is a circuit diagram showing using a sensing electrode to detect a fingerprint according to an embodiment of the invention.

For example, the fingerprint identification device 100 sequentially turns on the switches 141-143 to sequentially detect the fingerprint of the finger through the sensing electrodes 111-113. For example, if the switch 141 is turned on while the switches 142-143 are turned off, the fingerprint identification device 100 detects the fingerprint of the finger through the sensing electrode 111. Further, FIG. 2 is a circuit diagram showing using the sensing electrode to detect the fingerprint according to an embodiment of the invention. As shown in FIG. 2, during a detection period, a capacitor CS2 is formed between the sensing electrode 111 and the fingerprint, and the impedance element 121 and the capacitor CS2 forms a RC circuit. In addition, a parasitic capacitor is formed between the reading line 150 and the signal line 161. Likewise, a plurality of parasitic capacitors are formed between the reading line 150 and the signal lines 162-163. CP21-CP23 in FIG. 2 represent the parasitic capacitors formed by the reading line 150 and the signal lines 161-163.

It should be noted that, in an embodiment, the fingerprint identification device 100 further includes a signal source 190. The signal source 122 and the signal source 190 are used to generate the same reference signal S21, and the signal lines 161-163 receive the reference signal S21 generated by the signal source 190. Accordingly, as shown in FIG. 2, both ends of the parasitic capacitors CP21-CP23 receive the reference signal S21. In other words, in the detection period, a voltage difference between both ends of the parasitic capacitors CP21-CP23 remains unchanged, such that charges in the parasitic capacitors CP21-CP23 do not flow. That is, equivalently, the parasitic capacitors CP21-CP23 may be deemed absent to the RC circuit. Thus, the parasitic capacitors CP21-CP23 do not influence the RC circuit formed by the impedance element 121 and the capacitor CS2. Consequently, the accuracy of the fingerprint identification device 100 is improved efficiently.

Figure 3:
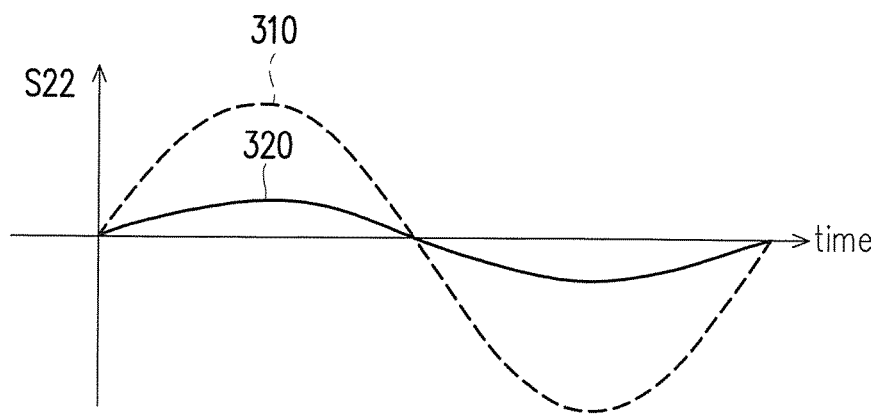
FIG. 3 is a waveform diagram of a sensing signal according to an embodiment of the invention.

For example, FIG. 3 is a waveform diagram of the sensing signal according to an embodiment of the invention. Specifically, when the sensing electrode 111 detects the ridge of the fingerprint, the capacitance of the capacitor CS2 framed by the sensing electrode 111 and the fingerprint is 1 fF, for example. That is, when the sensing electrode 111 detects the ridge of the fingerprint, the capacitor CS2 in the RC circuit is adjusted to 1 fF, such that the RC circuit outputs a sensing signal S22, as indicated by a curve 310. On the other hand, when the sensing electrode 111 detects the valley of the fingerprint, the capacitance of the capacitor CS2 formed by the sensing electrode 111 and the fingerprint is 0.1 fF, for example. That is, when the sensing electrode 111 detects the valley of the fingerprint, the capacitor CS2 in the RC circuit is adjusted to 0.1 fF, such that the RC circuit outputs the sensing signal S22, as indicated by a curve 320.

Specifically, the signal lines 161-163 in the fingerprint identification device 100 surround the reading line 150 on the left and right sides and the bottom side, and the signal lines 161-163 and the reading line 150 receive the same reference signal S21. In other words, the signal levels on the reading line 150 and the surrounding signal lines 161-163 change synchronously. Accordingly, the parasitic capacitors CP21-CP23 formed by the reading line 150 and the surrounding signal lines 161-163 may be deemed absent. Thereby, the accuracy of the fingerprint identification device 100 is improved efficiently.

Figure 4:
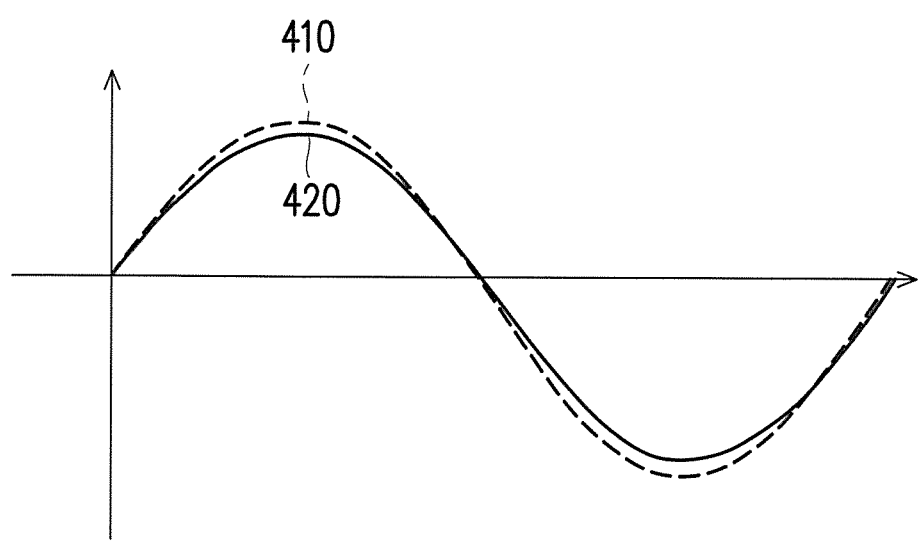
FIG. 4 is a waveform diagram of a sensing signal according to the conventional technology.

In contrast thereto, in the conventional fingerprint identification device, the signals on the reading line and the surrounding signal lines cannot change synchronously, which results in that the parasitic capacitors formed by the reading line and the surrounding signal lines may affect the operation of the conventional fingerprint identification device. For example, FIG. 4 is a waveform diagram of a sensing signal according to the conventional technology, wherein a curve 410 and a curve 420 respectively represent the sensing signals that the conventional fingerprint identification device generates corresponding to the ridge and the valley of the fingerprint. As indicated by the curve 410 and the curve 420, under the influence of the parasitic capacitors, the sensing signals that the conventional fingerprint identification device generates corresponding to the ridge and the valley of the fingerprint are very close to each other. As a result, the conventional fingerprint identification device is not able to accurately identify the fingerprint.

Please refer to FIG. 1 and FIG. 2. The amplifier 131 in the processing circuit 130 is able to amplify the sensing signal S22, and the analog-to-digital converter 132 is able to convert the amplified sensing signal S22 to sensing information. Because the RC circuit formed by the impedance element 121 and the capacitor CS2 is able to output the sensing signals S22 with different levels in response to different characteristics of the fingerprint, the processing circuit 130 is able to generate different sensing information in response to the different characteristics of the fingerprint as well. Accordingly, the processing circuit 130 determines whether the fingerprint detected by the sensing electrode 111 is the ridge or the valley according to the sensing information, so as to generate the fingerprint image based on the result of determination.

Furthermore, the sensing array 110 includes a first edge S11 and a second edge S12 adjacent to each other. The switches 141-143 are adjacent to the first edge S11, and the processing circuit 130 is adjacent to the second edge S12. That is, the amplifier 131 and the analog-to-digital converter 132 are adjacent to the second edge S12. In addition, the reading line 150 extends along the first edge S11 and the second edge S12 of the sensing array 110. The reading line 150, the signal line 161, and the signal line 162 are parallel to one another. A shape of each of the reading line 150, the signal line 161, and the signal line 162 is an L shape. Moreover, in an embodiment, each of the sensing electrodes 111-113 is a metal plate, and each of the reading line 150 and the signal lines 161-163 is an L-shaped metal line.

To sum up, in the fingerprint identification device of the invention, one reading line is surrounded by three signal lines respectively on the left and right sides and the bottom side, and the signal lines and the reading line receive the same reference signal. Accordingly, the signal levels on the reading line and the surrounding signal lines change synchronously, such that the influence, which the parasitic capacitors formed by the reading line and the surrounding signal lines may cause to the fingerprint identification device, is reduced efficiently to improve the accuracy of the fingerprint identification device.

It will be apparent to those skilled in the art that various modifications and variations can be made to the disclosed embodiments without departing from the scope or spirit of the invention. In view of the foregoing, it is intended that the disclosure covers modifications and variations provided that they fall within the scope of the following claims and their equivalents.

What is claimed is:

1. A fingerprint identification device, comprising:
   a sensing array comprising a sensing electrode to detect a fingerprint;
   a reading line disposed in a first metal layer and electrically connected to the sensing electrode;
   a first signal source generating a reference signal and electrically connected to the reading line through an impedance element, wherein the sensing electrode and the impedance element generate a sensing signal in response to the reference signal, and the fingerprint identification device identifies the fingerprint according to the sensing signal;
   a first signal line and a second signal line disposed in the first metal layer; and
   a third signal line disposed in a second metal layer, wherein the reading line is disposed between the first signal line and the second signal line, and an orthogonal projection of the reading line on the second metal layer overlaps an orthogonal projection of the third signal line on the second metal layer, and the first to the third signal lines receive the reference signal.

2. The fingerprint identification device according to claim 1, further comprising a switch electrically connected between the reading line and the sensing electrode.

3. The fingerprint identification device according to claim 2, further comprising:
   a processing circuit electrically connected to the reading line, wherein when the switch is turned on, the processing circuit receives the sensing signal through the reading line and converts the sensing signal into sensing information.

4. The fingerprint identification device according to claim 3, wherein the sensing array comprises a first edge and a second edge adjacent to each other, and the switch is adjacent to the first edge and the processing circuit is adjacent to the second edge.

5. The fingerprint identification device according to claim 4, wherein the processing circuit comprises:
   an amplifier adjacent to the second edge and amplifying the sensing signal; and
   an analog-to-digital converter adjacent to the second edge and converting the amplified sensing signal into the sensing information.

6. The fingerprint identification device according to claim 5, wherein the reading line extends along the first edge and the second edge and is electrically connected to the switch and the amplifier.

7. The fingerprint identification device according to claim 6, wherein the reading line, the first signal line, and the second signal line are parallel to one another.

8. The fingerprint identification device according to claim 7, wherein a shape of each of the reading line, the first signal line, and the second signal line is an L shape.

9. The fingerprint identification device according to claim 1, further comprising a substrate, wherein the second metal layer is disposed between the first metal layer and the substrate.

10. The fingerprint identification device according to claim 9, wherein the sensing electrode is disposed in a third metal layer, and the first metal layer is disposed between the second metal layer and the third metal layer.

11. The fingerprint identification device according to claim 1, wherein the sensing electrode is a metal plate, and each of the reading line, the first signal line, the second signal line, and the third signal line is an L-shaped metal line.

12. The fingerprint identification device according to claim 11, wherein the reading line, the first signal line, and the second signal line are parallel to one another.

13. The fingerprint identification device according to claim 1, further comprising:
   a second signal source generating the reference signal, wherein the first to the third signal lines receive the reference signal generated by the second signal source.

* * * * *